United States Patent [19]
Burtnyk et al.

[11] Patent Number: 5,471,541
[45] Date of Patent: Nov. 28, 1995

[54] SYSTEM FOR DETERMINING THE POSE OF AN OBJECT WHICH UTILIZES RANGE PROFILES AND SYNETHIC PROFILES DERIVED FROM A MODEL

[75] Inventors: Nestor Burtnyk, Kanata; Michael A. Greenspan, Ottawa, both of Canada

[73] Assignee: National Research Council of Canada, Ottawa, Canada

[21] Appl. No.: 152,745

[22] Filed: Nov. 16, 1993

[51] Int. Cl.$^6$ .............................. G06T 7/00; G01B 11/24
[52] U.S. Cl. ........................... 382/153; 382/154; 356/376
[58] Field of Search .............................. 382/8, 1, 48, 30; 364/559; 348/94; 395/94; 356/375, 376

[56] References Cited

U.S. PATENT DOCUMENTS

| | | | |
|---|---|---|---|
| 4,658,428 | 4/1987 | Bedros et al. | 382/30 |
| 5,220,619 | 6/1993 | Keokoek | 382/1 |

OTHER PUBLICATIONS

Cosmas et al. "Geometrical Testing of Three-Dimensional Objects with the Aid of Pattern Recognition," IEE Proceedings E. vol. 138, Iss: 4, Jul. 1991, pp. 250–254.

Jacobs. "Optimal Matching of Planar Models in 3D Scenes." Proc. 1991 IEEE Comp. Soc. Conf. Comp. Vision and Patt. Recog., Jun. 1991, pp. 269–274.

Stockman et al. "Sensing and Recognition of Rigid Objects Using Structured Light," IEEE Control Systems Magazine, vol. 8 Iss: 3, Jun. 1988, pp. 14–22.

Quek et al. "An Abstraction-Based Approach to 3–D Pose Determination from Rouge Images," IEEE Trans. Patt. Analysis and Mach. Intel, vol. 15 Iss: 7, Jul. 1993, pp. 722–736.

Ponce et al. "On Using CAD Models to Compute the Pose of Curved 3D Objects" Workshop on Div. Auto. CAD–Based Vision, Jun. 1991, pp. 136–145.

Kriegman et al. "On Recognizing and Positioning Curved 3–D Objects from Image Contours" IEEE Trans. Pat. Analy. Mach. Int., vol. 12, No. 12, 1127–1137.

Arman et al. "Object Recognition in Dense Range Images Using a CAD System as a Model Base" Proc. 1990 IEEE Conf. Robotics & Automation vol. 3, May 1990, pp. 1858–1863.

Maruyama et al, "Range Sensing by Projecting Multiple Slits with Random Cuts" IEEE Trans Patt. Analysis and Mach. Intel., vol. 15 Iss 6, Jun. 1993 pp. 647–651.

Primary Examiner—Michael T. Razavi
Assistant Examiner—Jon Chang
Attorney, Agent, or Firm—Neil Teitelbaum

[57] ABSTRACT

A method for determining the 3-D pose of an object is provided assuming that an approximate pose of the object is known. As a laser range camera scans the object, depth profiles of the object are obtained and stored in a memory. Synthetic profiles are obtained from a model of the object that has been oriented to the assumed pose of the object, by using a conventional raster rendering technique to obtain a series of slices of the model. Once this synthetic profile signature of the model of the object is generated, a comparison is performed between this profile signature and the profiles obtained from the laser range camera. When a suitable match is found, a correction to the 3-D pose is calculated from the offset parameters associated with the match; further refinement may be performed by repeating the process.

4 Claims, 4 Drawing Sheets

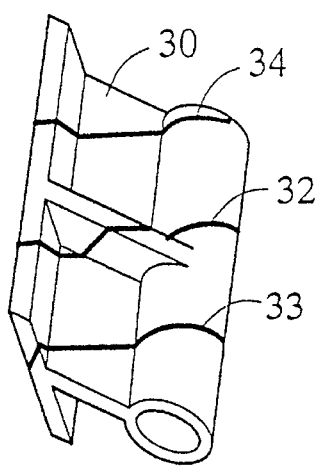
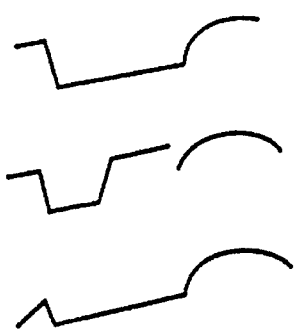
Fig. 3a            Fig. 3b
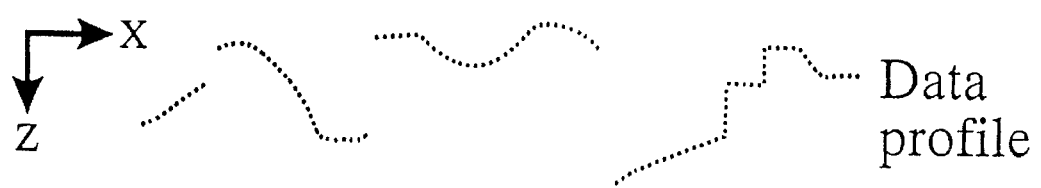
Fig. 4a
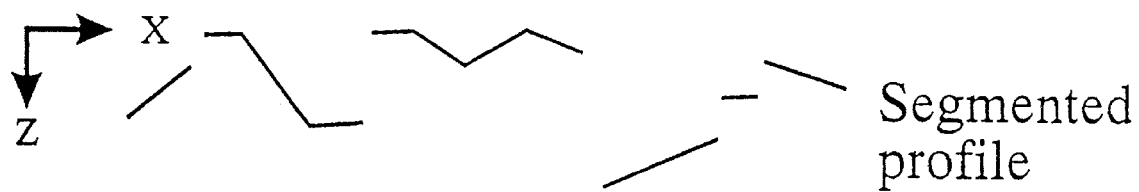
Fig. 4b

SYSTEM FOR DETERMINING THE POSE OF AN OBJECT WHICH UTILIZES RANGE PROFILES AND SYNETHIC PROFILES DERIVED FROM A MODEL

FIELD OF THE INVENTION

This invention relates to the field of vision and robotics and more particularly, relates to a method of determining the 3-D pose of an object.

BACKGROUND OF THE INVENTION

Grasping an object by a robot manipulator generally requires that the 3-D pose of the object be known. In many applications in robotics, the geometry of the task environment is uncertain so that the position and orientation of a target object may be known only approximately. In order to grasp an object successfully and safely, the actual pose of the object must be determined relative to the robot hand or gripper using some form of vision sensing. Many solutions to this problem work only under certain conditions. For example, a system that is capable of recognizing an object having a simple polygonal shape may not be capable of recognizing an object whose shape is made up of complex curved surfaces. As well, a system capable of recognizing and grasping a particular isolated object may fail to recognize and grasp the same object in a cluttered environment.

The problem of refining the estimate of the pose given the identity of an object and its approximate pose is known as pose refinement. Pose refinement is a particular instance of a more general problem of registration of 3-D shapes. An example of its application is described by Burtnyk, N., and Basran, J., in Supervisory Control of Telerobots in Unstructured Environments, in Proceedings of 5th International Conference on Advanced Robotics, Piza, Italy, June 1991, pages 1420–1424, NRC 31833. In this application, an operator points to an object of interest on a video display of the task environment and provides its approximate pose by orienting a model of that object into a similar view. The operator instructs the robot to move over the object with an appropriate standoff and to use a wrist-mounted 3-D camera to refine the pose before grasping.

Relatively little work has been published in the area of registration, pose estimation, alignment, and motion estimation of 3-D free-form shapes and most of the existing publications address global shape matching or registration pertaining to limited classes of shapes.

Paul J. Besl and Neil D. McKay, in a paper entitled A Method For Registration of 3-D Shapes, published in IEEE Transaction on Pattern Analysis and Machine Intelligence Vol. 14(2) P. 239–256, 1992, have presented a comprehensive overview of the problems associated with pose registration. Besl and McKay address a wide variety of geometric shape representations, from point sets to free-form curves and surfaces and present the iterative closest point (ICP) method as a general solution. The solution is presented in the form of fitting a "sensed data" shape to a "given model" shape. The ICP method iteratively computes the distance of each data point to the closest point on the model and then determines the transformation that minimizes these distances. However, this solution is only of use for that class of problems where the entire data set corresponds to the model shape. It does not distinguish between data points that correspond to the model shape and those that do not. Therefore, if only a subset of the data set corresponds to the model shape, these "outliers" will affect the result and must be removed from the data in a preprocessing stage before the registration process is applied.

It is an object of this invention to provide a method for refining the pose of an object that may be situated in a cluttered background.

SUMMARY OF THE INVENTION

In accordance with the invention, a method is provided for determining the 3-D location of an object in space, given a model of the object, range profile data that has been acquired by scanning the object and approximate information relating to location of the object, comprising the steps of:

a) generating a profile signature of the object from a model of the object corresponding to the currently estimated location of the object in space;

b) searching the range profile data to obtain a best match between the profile signature and the range profile data; and, c) calculating a correction of the location of the model from the offset between the profile signature and the range profile data that produced the best match in step (b).

In accordance with another aspect of the invention there is provided a method of determining the 3-D position and orientation of an object in space, given a stored digital representation of a model of the object, stored digital range profile data that has been acquired by scanning the object, and approximate information relating to position and orientation of the object, the method comprising the steps of:

a) generating at least 2 signature profiles of the object from a model of the object corresponding to the currently estimated location of the object in space;

b) searching the range profile data to obtain a best match between the at least two signature profiles and two corresponding data profiles of the object;

c) calculating a correction of the location of the model from the offsets between the signature profiles and the data profiles that produced the best match in step (b); and, d) repeating steps (a) to (c) until a satisfactory match is found.

The method in accordance with the invention works for any object shape and with many object representations; the method attempts to predict what a camera would see if an object were in its assumed pose, and then searches for a match in the actual data. As opposed to other known methods, this method does not extract features from the data, but instead, a set of synthetic or simulated profiles of a model are generated as a signature from the camera's viewpoint in accordance with the camera's scanning geometry. A "best" match of this profile signature is found in the actual data profiles through a search. A 6 degree of freedom pose correction of the model is derived from the offsets that produce this "best" match.

The method in accordance with this invention can also be used to register two sets of range data obtained as multiple views. The processing method is the same with one data set treated as a model.

If the range data is collected by a means that does not retain the sequences of adjacent points in the form of profiles, this cloud of data points may be reorganized into profiles by resampling.

BRIEF DESCRIPTION OF THE DRAWINGS

Exemplary embodiments of the drawings will be described in conjunction with the drawings in which:

FIG. 3a is a perspective view of a model of the scanned object including three generated synthetic profiles of the model of the object;

FIG. 3b is a diagram showing the three generated synthetic profiles of FIG. 3a;

FIG. 4a is a diagram of a data profile of a scene;

FIG. 4b is a diagram of the data profile of FIG. 4a shown as a segmented profile.

DETAILED DESCRIPTION

Figure 1:
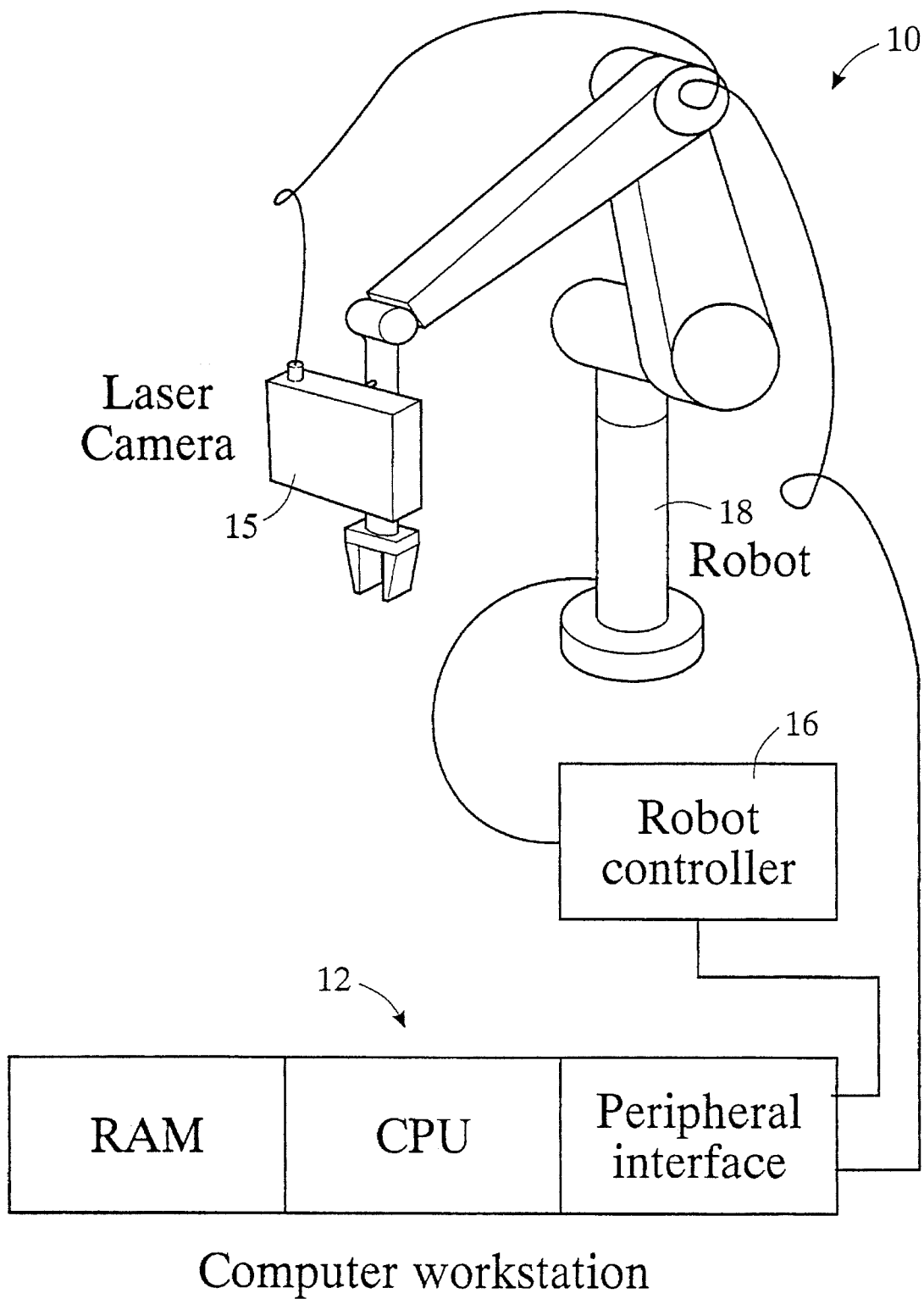
FIG. 1 is a perspective view of a robot having an arm supporting a laser camera, the figure also including a block diagram of a computer and control circuitry coupled to the robot.

Referring to FIG. 1, a system 10 for performing pose refinement is shown. The system comprises a high speed general purpose computer workstation 12 including a suitable amount of random access memory (RAM) for storing representations of scanned images. A laser range camera 15, mounted on the wrist of a robot 18, is coupled via a peripheral interface circuit to, and communicates with the computer 12, thereby allowing scanned images to be stored and processed by the computer. A robot controller 16 is responsive to control signals provided by the computer workstation 12 via the peripheral interface circuit.

Inherent in the task of performing pose refinement, an approximate pose of an object is given; as well, there is a certain expectation that the range signature of the object will be present in the data. Therefore, a strategy is to generate a synthetic profile or signature of the object and to search for it in the actual scanned profiles. A synthetic profile is a profile of a model of the object. A preferred format for this generated signature is a profile that corresponds in format to those profiles produced by the data collection process, thus allowing a simple progression through the acquired data during the search.

Figure 2:
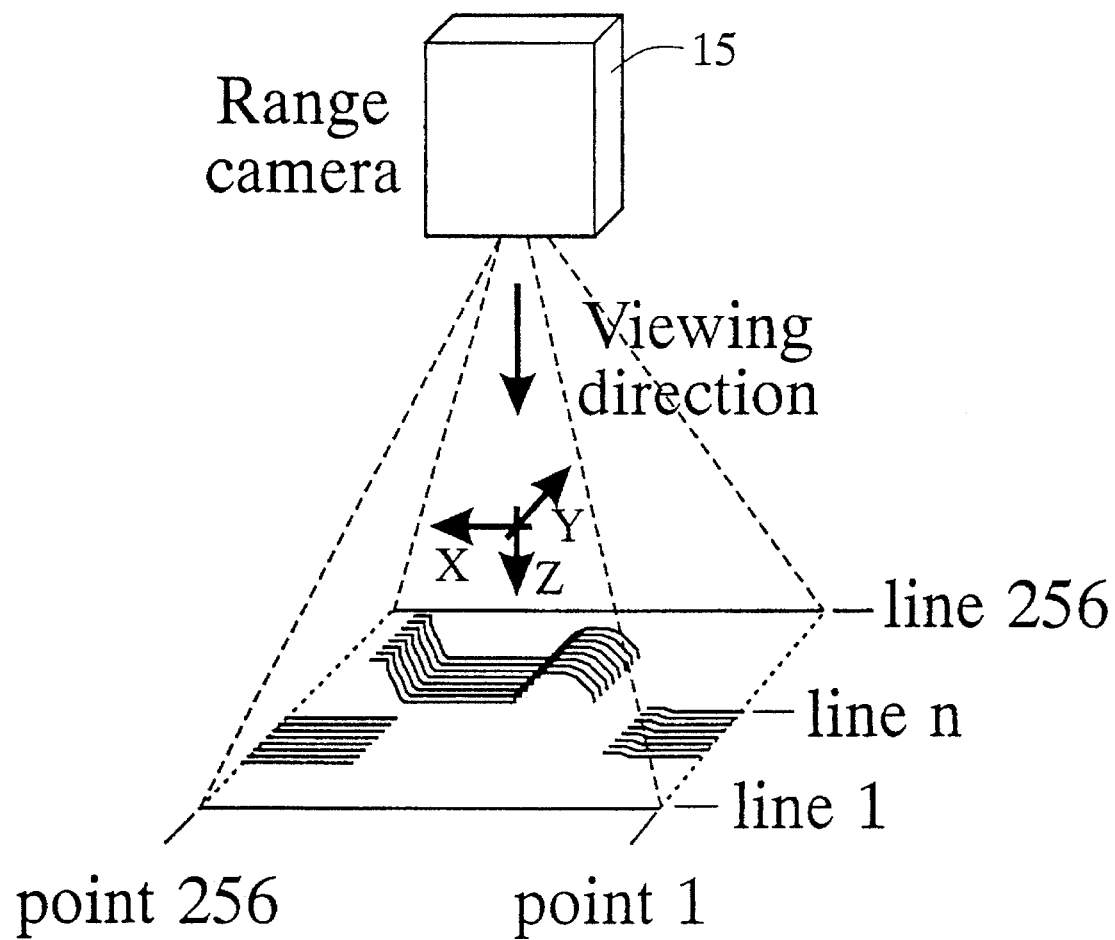
FIG. 2 is a perspective view of the laser range camera of FIG. 1 including scanned lines of an object scanned by the range camera.

As the laser range camera 15 scans an object, it provides a direct measure of the 3-D coordinates of points on the surfaces being sampled. The camera is similar in type to the one described by Rioux, M., Bechthold, G., Taylor, D., Duggan, M., in a paper entitled Design of a Large Depth of View 3 Dimensional Camera for Robot Vision, Optical Engineering Vol. 26, No. 12 Pages 1245–1250 1987, NRC 29130, but has an additional Y-axis drive that allows the acquisition of 256 parallel scans of 256 points providing images as shown in FIG. 2. Each scan line is an XZ profile across a scanned scene at a given Y position. The Y value is given in terms of the angular position of the Y-mirror, so the scanline planes are actually angularly spaced and not truly parallel; however, the method in accordance with this invention is tolerant of minor non-parallel variances.

Acquired "real" data provided by the laser range profile camera is in the fore of nearly parallel scan lines, similar to slices through the object, providing depth profile information. Synthetic profiles may be generated in a similar manner, mimicking the way in which the range profile camera collects data. As long as the profiles are nearly parallel, the profile signature suffers little distortion as the object is displaced in the field of view of the camera. Thus, the process of generating synthetic profiles is consistent with the scanning geometry of the camera.

Referring to FIGS. 3a and 3b, synthetic profiles in the form of model cross-sections are generated as slices through fractional points along the Y-direction of the object model 30, for example, at the midpoint 32, the one-quarter point 33 and the three-quarter point 34. Also, for the best correspondence with the data, points or surfaces along these synthetic model cross-sections that would not be visible from the effective viewpoint of the camera are removed. A preferred method of generating profiles is using a Z-buffer technique, however other standard known methods of generating raster lines for rendering images from computer aided designed (CAD) models may alternatively be used. The resulting ensemble of cross-sections is a complete signature that represents the object in its current estimated pose.

Since a cross-section is equivalent to the generation of a raster scanline across an object for display, essentially any surface representation method currently in use is acceptable without restriction. The extracted cross-sections are convened to a point sequence and all subsequent matching is performed between point sets without the model representation method coming further into play.

The general signature search (SS) method, includes the following steps:

1. Generate a set of cross-sections of the object model as a signature that the camera should see if the object were in its currently estimated pose;
2. Select one of the interior cross-sections as a seed to be used in the search; (an interior cross-section being one that is well inside the object and not at the periphery of the object;)
3. Search through the actual data profiles for candidate matches with the seed;
4. Evaluate each candidate by scoring the goodness of the overall match for the whole ensemble of signature profiles;
5. Use the offsets that produce the "best" match to derive a 6 degree of freedom (dof) pose correction for the model; and
6 Iterate steps 1 to 5 until the correction is below a threshold.

In order to minimize search time, one interior cross-section of the model signature is selected as a seed to drive the search. The best choice of the seed is the cross-section profile that has the greatest deviation from a straight line. The seed search in step 3 includes two stages:

i. identifying candidates that represent a potential match; and,
ii. performing a "best" fit between profile pairs to find the offsets for a best correspondence.

Stage (i) is intended to be selective so as to avoid a full evaluation of obvious mismatches, yet tolerant enough to ensure that "correct" matches are not rejected. This initial correspondence is best carded out based on the gross shape of the profiles. Therefore, both the actual data profiles and the model cross-section profiles are subjected to a segmentation process where the gross shape of the profile is extracted as a sequence of line segments, as shown in FIGS.

4a and 4b. Planar regions on the profile tend to be retained while curved surface regions tend to be approximated by a string of connected line segments unless the curvature is too great. Any loss of connectivity between successive line segments is of little consequence. Referring to FIG. 4b, coarse shape discontinuities such as jump edges and deep convex or concave roof edges are preserved while all finer discontinuities are ignored. The first search to identify the candidate matches is performed on this segmented data. This achieves a fast, first-order correction of model location that is particularly effective in removing large positional errors. The precise characteristic of the segmentation is not a critical factor; it is simply a means to provide an efficient screening process and to establish candidate coarse matches for the succeeding step.

If the residual error resulting from the coarse match exceeds a specified threshold, the candidate is rejected. Otherwise, for each accepted match, the translation and rotation of the seed section is further adjusted for the best fit to the matching data profile.

The operation of the second stage (ii), is performed directly on the point sets of the actual data profile and model profile. Starting with the offsets established by stage (i), the closest attachments of all points in the model profile to the data profile are determined. Since the actual profiles are used, all the finer details in the profiles that were ignored in the first stage are now included. These attachments are minimized by an adjustment of the translational and rotational offsets of the model profile. This is a 2 D optimization in 3 degrees of freedom operating in the plane of the data profile. Minimization is performed on the basis of average error rather than mean square error; the profile shapes are only similar rather than the same, and the goal is to align the profiles over that portion where the shapes appear to correspond. Following the offset adjustment, the attachment and minimization loop is repeated until the offsets stabilize. This process is equivalent to the ICP algorithm operating in 2 D.

For the evaluation of step 4, the translational and rotational offsets of the seed cross-section are applied to the remaining cross-sections to evaluate the goodness of the fit of the whole ensemble. This is equivalent to repeating stage (ii) of step 3 for each cross-section with its corresponding data profile. Because the model is treated as a rigid body, the corresponding data profile for each cross-section is determined by its Y distance from the seed section. Also, only the translational offset is adjusted during the minimization process of stage (ii) since the cross-sections cannot have different rotations. Upon completion of the search, the candidate with the lowest ensemble residual error is taken as the best match. The average translational offsets in the X and Z directions for the whole ensemble become X and Z pose corrections, while the rotational offset gives the pitch correction about the Y axis. The pose correction in Y is determined from the median Y value of the data profiles that produced the best match. Roll and yaw corrections are determined from the differential translational offsets in X and Z among the model cross-sections. After correcting the pose in 6 degrees of freedom, the entire process is repeated using the updated pose.

In summary, numerous other embodiments of this invention may be envisaged without departing from the spirit and scope of the invention.

Signature Stability

Since a set of signature profiles of the object that contain a pose error effectively drive the search, one may question the stability of the profile shape with pose error. In this regard, it should be emphasized that the goal of the search is to find the profile with the greatest similarity to the signature profile, rather than an exact match. The function that expresses how an object's profile changes with orientation is a kind of shape autocorrelation function. The primary interest is not the exact mathematical formulation of this function. Instead, some confirmation is sought regarding the pose error range over which adequate profile shape similarity can be expected. It is, of course, intuitively acceptable that the smaller the pose error, the greater the similarity.

Statistical analysis has been carded out to measure the stability of profile signatures. For an arbitrary view of an object model, a set of seven signature profiles have been extracted as a reference. Similar sets of profiles were generated after pose errors were introduced. Each of these secondary sets of profiles were fitted to the reference set for a best match and the differences between the two sets of profiles were recorded. For each reference view, pose errors were introduced in increments of 5 degrees in each of roll, pitch and yaw and the profile error distributions were accumulated. This process was then repeated for nearby views which differed by 15 and 30 degrees in each of roll, pitch and yaw from the initial reference view. The results of these 78 profile set matches were accumulated to produce a statistical distribution of profile error for that reference view. Similar error distributions were produced for six different reference views of each of two object model types, an H fixture that is made up essentially of planar faces, and a funnel that consists only of curved surfaces. Each of these objects has a largest dimension of about 120 mm and the sampling process simulated a nominal camera standoff distance of about 250 mm.

Figure 5A:
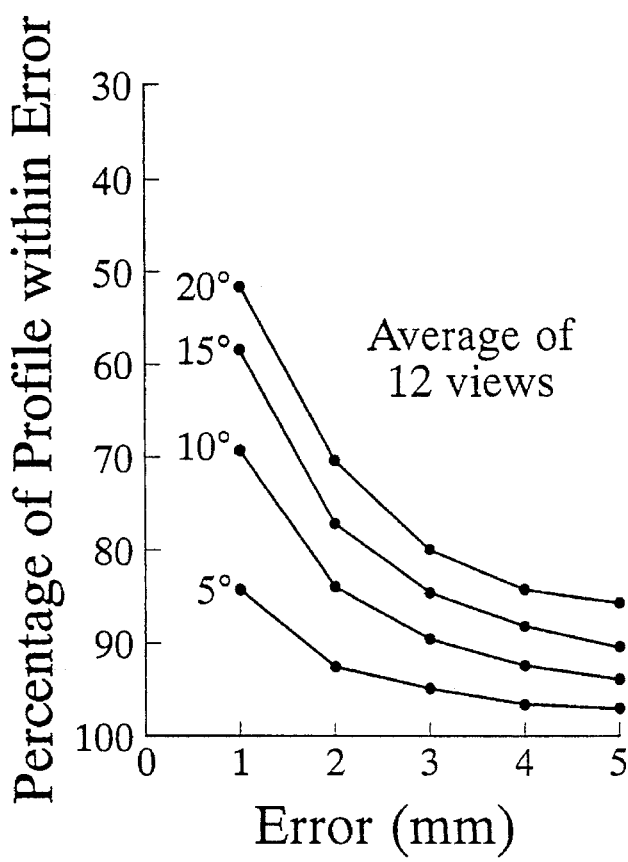
FIG. 5a is a graph showing the percentage of a profile with pose error that matches a profile without pose error within an error threshold as an average for many reference views; and, FIG. 5b is a graph showing the percentage of a profile with pose error that matches a profile without pose error within an error threshold for single reference views that resulted in minimum and maximum errors.
Figure 5B:
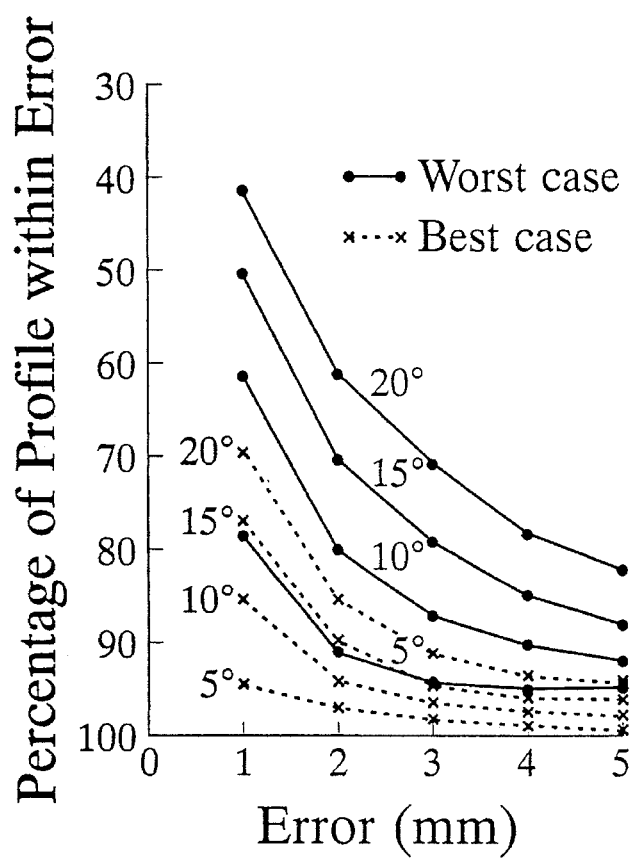

The results of the analysis are summarized in FIGS. 5a and 5b. FIG. 5a shows the statistical distribution of profile error as an average for all 12 reference views. FIG. 5b shows the distribution for the single views with maximum and minimum errors. As may be expected, all distributions have the same characteristic shape, but profile deviations were more sensitive to pose error in some views than in others. Even in the worst case, for pose errors up to 15 degrees, more than 75% of the profile was within a 2.5 mm error and more than 50% was within 1 mm. One can conclude from this analysis that effective detection of the object signature in actual profile data may be expected for pose errors up to at least 15 degrees.

What we claim is:

1. A method of determining the 3-D position and orientation of an object relative to a scanning device, given a surface model of the object, range profiles that have been acquired by scanning the object, and the object's approximate location defined by the 3-D position and orientation relative to the scanning device, the method comprising the steps of:

a) generating a set of at least 2 synthetic 2-D profiles of the object from a model of the object by simulating how the scanning device would have scanned the object if the object were located at the approximate 3-D location;

b) searching through the acquired range profiles to select a subset of these profiles whose 2-D waveforms most closely match the 2-D waveforms of the set of synthetic profiles;

c) determining the amount of 2-D translational and rotational offset between the 2-D waveforms of the synthetic profiles and the 2-D waveforms of the acquired range profiles that produced this most close match;

d) calculating a correction of the approximate three dimensional position and orientation of the model representing the object from these 2-D offsets between the synthetic profiles and the acquired range profiles that produced the best match in step (b) to obtain a closer approximate 3-D position and orientation of the object; and, e) repeating steps (a) to (d) until the correction is below a predetermined threshold.

2. A method as defined in claim 1, wherein the generated synthetic profiles are comprised of a plurality of data points, the profile being a cross-section of the model of the object generated as a slice through a fractional point along an axis of the model.

3. A method as defined in claim 1, wherein the step of searching includes filtering comprising the steps of:

segmenting the acquired range profiles into line segments characterizing their coarse shapes;

storing the line segments in a random access memory;

segmenting the at least two synthetic profiles into line segments characterizing their coarse shapes;

comparing the coarse segments of the at least two synthetic profiles with the coarse segments of the acquired range profiles to obtain candidate matches; and evaluating each candidate further by comparing the waveform shapes of the at least two synthetic profiles with the data points of the corresponding acquired range profiles to obtain a best match.

4. A method as defined in claim 3, further comprising the steps of:

(i) selecting a synthetic profile that has the greatest deviation from a straight line as a principal synthetic profile;

(ii) locating a segment in the principal synthetic profile that has the longest horizontal span, that segment being a seed segment; and, (iii) for each segmented range profile, searching for an acceptable candidate match by aligning the seed segment with each data segment, wherein steps (i) to (iii) are performed after the step of segmenting in claim 3.

* * * * *